United States Patent [19]

Louison et al.

[11] Patent Number: 4,860,434

[45] Date of Patent: Aug. 29, 1989

[54] METHOD OF MAKING FLAT ELECTRICAL RESISTANCE HEATING ELEMENT

[75] Inventors: Bernard Louison, Saint-Etienne; Jean Hennuy, Villefranche, both of France

[73] Assignee: Seb S.A., Selongey, France

[21] Appl. No.: 177,905

[22] Filed: Apr. 7, 1988

Related U.S. Application Data

[62] Division of Ser. No. 852,028, Apr. 14, 1986, abandoned.

[30] Foreign Application Priority Data

Apr. 19, 1985 [FR] France ................................ 85 05963

[51] Int. Cl.4 .......................... H05B 3/10; H01C 1/02; B32B 31/00; D02G 3/00

[52] U.S. Cl. ...................................... 29/611; 219/544; 219/548; 219/436; 156/275.5; 156/307.1; 156/331.1; 156/298; 338/212; 338/255; 338/293; 428/363; 428/373; 428/375; 428/391

[58] Field of Search ............... 219/528, 548, 544, 549, 219/345, 528, 529, 541–549, 254, 255, 436, 438; 338/212, 293, 255, 212, 255, 293; 156/179, 298, 275.5, 293, 307.1, 331.1, 298; 29/592 R, 611; 428/363, 373, 375, 391

[56] References Cited

U.S. PATENT DOCUMENTS

| | | | |
|---|---|---|---|
| 2,889,439 | 6/1959 | Musgrave | 219/345 |
| 2,900,290 | 8/1959 | Bethge | 156/298 |
| 2,952,761 | 9/1960 | Smith-Johannsen | 219/541 |
| 4,063,068 | 12/1977 | Johnson et al. | 219/441 |

FOREIGN PATENT DOCUMENTS 866938 5/1961 United Kingdom .

*Primary Examiner*—E. A. Goldberg
*Assistant Examiner*—Gerald E. Preston
*Attorney, Agent, or Firm*—Young & Thompson

[57] ABSTRACT

The flat electrical resistance heating element is intended principally for a household article having a heating surface.

The heating element comprises a heating resistance cut out from a metal sheet (1) which is coated with a substrate (2) of electrically insulating material resistant to the heating temperature and adherent to the metal sheet (1) and to the material of which the support (5) of the heating surface of the article is made.

Use principally in base-heated kitchen utensils and irons.

8 Claims, 7 Drawing Sheets

METHOD OF MAKING FLAT ELECTRICAL RESISTANCE HEATING ELEMENT

This application is a division of application Ser. No. 852,028, filed 4/14/86 now abandoned.

The present invention relates to a flat electrical resistance heating element, especially for a household article containing a heating surface. The invention is likewise directed to heating articles comprising such a heating element. The invention is applied for preference, but not exclusively, to kitchen utensils with a heating base, to cooking plates, to hotplates, to radiators and radiant panels and to [electric] irons.

Base-heated kitchen utensils usually have a tubular, screened electrical resistance which is fitted by mounting on the base of the utensil. This method of fitting is complex and troublesome. Furthermore it does not allow satisfactory thermal contact between the resistance and the base of the utensil, nor permit homogeneous temperature distribution. In the case of electric irons, the heating sole is generally of cast aluminium on top of a screened electrical resistance. The manufacture of such soles is likewise complicated and troublesome. Moreover, as in the case of base-heated utensils, the electrical resistance makes contact with the sole along a generally U-shaped line, an arrangement which does not allow the temperature distribution to be satisfactorily homogeneous.

In the present state of the art this difficulty is ameliorated by making relatively thick soles. Nevertheless, such a solution has a considerable effect on the cost as well as the weight of the article, so that recourse must be had to relatively expensive light alloys.

The object of the present invention is to remedy the disadvantages of known embodiments by providing a flat heating element which is easy to integrate with the heating article which gives an assurance of uniform heat distribution over the heating surface of the article, and which is inexpensive to manufacture.

According to the invention, this electrical resistance heating element, especially for a household article having a heating surface, comprises a heating resistance cut out of a metal sheet, and is characterized in that the sheet is coated with a substrate of electrically insulating material, resistant to the heating temperature and capable of adhering to the metal sheet and to the material of which the support of the heating surface of the article is made.

The fact that the resistance is to be cut from a sheet of metal makes it possible to obtain a substantial ohmic [resistance] value per unit surface area, and moreover to distribute the heating temperature in uniform manner over the entire surface of the resistance. Furthermore such resistances cut from a metal sheet are inexpensive to manufacture.

The fact that the resistive sheet is to be coated with an insulating substrate adhering to the sheet and to the material of which the support of the heating surface of the article is made, enables the problems of insulating the resistive sheet and securing the heating element to the heating article to be solved in a simple and efficacious manner.

According to one advantageous version of the invention, the metal sheet is chosen from among the following resistive metals: stainless steel, iron-nickel alloy and nickel-chrome alloy. The sheets made from these alloys may have thicknesses between 0.08 mm and 0.015 mm, while still exhibiting mechanical properties sufficient for withstanding without damage the various manipulations which are necessary for the manufacture of the heating element.

According to a preferred version of the invention, in the case of a heating element intended for heating to a temperature between 400° and 500° C., the metal sheet is sandwiched between two felted layers of ceramic material impregnated with a resin polymerisable under the action of heat, the two felted layers being connected together and adhering to the metal sheet, the resin being chosen for preference from among the polyimide, phenolic and silicone resins.

According to another version of the invention, the metal sheet is sandwiched between two layers based on alumina and projected in the form of plasma.

According to another version of the invention, the metal sheet is sandwiched between two layers of enamel.

In the case where felted layers of ceramic impregnated with resin are being used, the bonding between the resistive sheet and the support is obtained during the polymerisation of the resin. The two felted layers of ceramic assure excellent electrical insulation of the resistive sheet and confer on the heating element an excellent heat resistance. After polymerisation of the resin which impregnates the felted layers, the latter becomes hard and resistant in respect of mechanical shock. At the same time, the resin allows the heating element to adhere to a metallic support.

The application of a layer of alumina projected in the form of plasma, or of a layer of enamel which is baked, likewise permits an excellent bonding between the resistive sheet and the support to be obtained, as well as an excellent electrical insulation.

The invention may likewise be applied to heating articles having a support to which a heating element in accordance with the invention is fixed. This support can be chosen from among the following materials: aluminium, stainless steel, mild steel, ceramics, crystalline vitreous material and glass. The heating element can be fixed to the support by means of a layer of resin which can correspond to the resin which impregnates the substrate, while the latter is for example based on a felt of ceramic fibres. The heating element can also be fixed to the support by means of a plate applied with pressure against the heating element and fixed to said support. According to another version of the invention, the heating element is integrated to the support at the moment of its manufacture, for example by polymerisation of the resin contained in the substrate.

Other details and advantages of the invention will be apparent from the following description.

In the attached drawings, given by way of non-limiting example,

Figure 1:
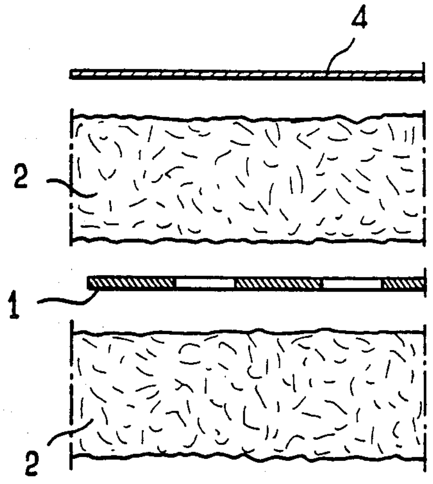
FIG. 1 is a sectional view of the various layers of a flat heating element according to the invention, before these layers are assembled.
Figure 4:
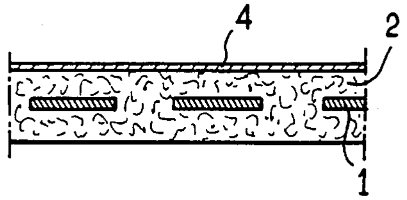
FIG. 4 is a sectional view of the finished heating element, after the various layers have been assembled.
Figure 5:
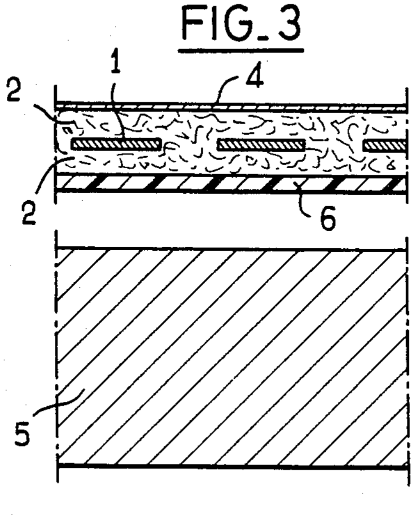
FIG. 5 is a sectional view showing the heating element and a support, before assembly.

In the embodiment of FIGS. 1 and 4, the heating element comprises a resistance 1 cut from a metal sheet held between two layers 2 based on a felt of ceramic fibres impregnated with polyimide resin. This felt consists of ceramic fibres and mica flakes amounting to 70 to 80% of the product, the resins exercising the function of a binder when they are polymerised, while the electrical insulation is mainly due to the above materials.

Figure 2:
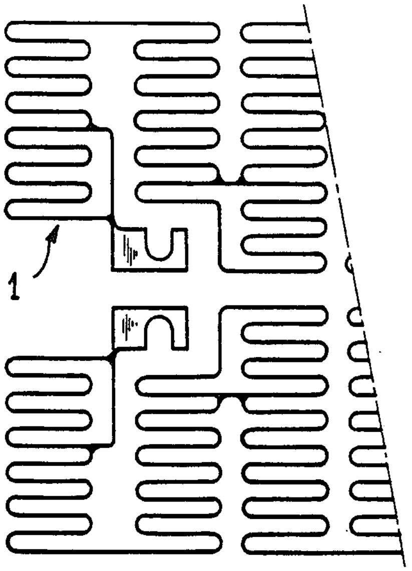
FIG. 2 is a partial plan view of the resistance obtained from a cutout sheet.

The metal sheet 1 is for example a sheet of stainless steel, of iron-nickel alloy or nickel-chrome alloy having a thickness between 0.08 mm and 0.015 mm. This sheet 1 is cut out so as to form (see FIG. 2) a band of constant width, capable of carrying at certain points connecting straps intended for selective cutting so as to vary the length of the resistance and thereby to obtain the different characteristics of the resistive circuit, or to permit adjustment of said characteristics to requirements.

Figure 3:
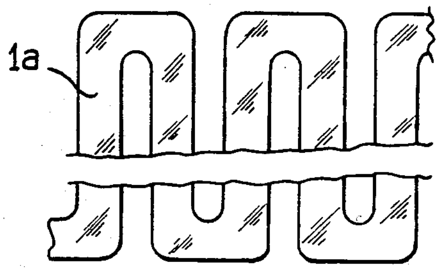
FIG. 3 is a plan view similar to FIG. 2 and relating to another embodiment of the resistance.

The metal sheet may also be cut out as shown in FIG. 3, so as to form a continuous resistive band having an undulate contour. The metal sheet 1 is for preference treated chemically or mechanically so as to improve the adhesion of the layers 2.

In this example, this adhesion is obtained by heating the assembly comprised of the sheet 1 held in a sandwich between the two layers 2, so as to polymerise the polyimide resin contained in the layers. This polymerisation has the effect of bonding the two layers 2 together across the openings 3 made in the sheet 1 (see FIG. 4), and of bonding these two layers 2 to the sheet 1.

The two layers 2 can be made for example in the material described in French Patent No 80 23 943 of Nov. 5, 1980.

In order to prevent adhesion of the layer 2 to the heating surface used for polymerising the resin, the outer face of said layer is masked by a metal sheet 4, for example of aluminium, which at the same time has a heat diffusing effect or a self-radiant effect and mechanically protects the layer 2.

The heating element obtained, as shown in FIG. 4, can be secured on a metal support 5 of aluminium, stainless steel, mild steel, ceramics or crystalline vitreous material or glass. This fixture can be effected by placing between the support 5 and the heating element a layer of polyimide resin 6 and heating the assembly so as to polymerise the resin.

Figure 6:
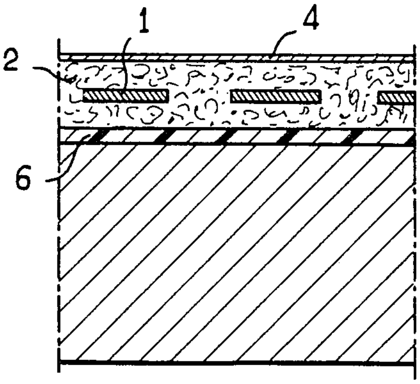
FIG. 6 is a view similar to FIG. 5, showing the finished heating plate.

The heating plate obtained, as shown in FIG. 6, can constitute a cooking plate, the heating base of a kitchen utensil, the sole of an iron, etc. In the case of FIGS. 1, 4, 5 and 6, the thickness of the layers has been strongly exaggerated for drawing clarity. In reality the thickness of the heating element is not generally greater than a millimeter. The assembly thus constructed can withstand temperatures up to and even exceeding 350° C., while assuring a perfectly uniform distribution of temperature over the entire surface of the heating plate.

Figure 7:
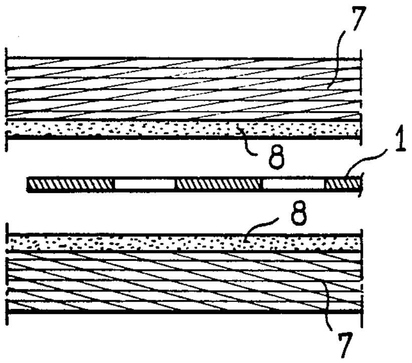
FIG. 7 is a view similar to FIG. 1, relating to a first embodiment.

In the case of the embodiment according to FIG. 7, the resistive sheet 1 is placed between two layers, each comprising a layer 7 of polymerised samicanite (a laminate of paper sheets impregnated with phenolic resin charged with mica flakes). Each layer 7 of samicanite is covered by a layer of phenolic resin 8, unpolymerised. The resistive sheet 1 is placed between the two layers 8 of unpolymerised phenolic resin.

Figure 8:
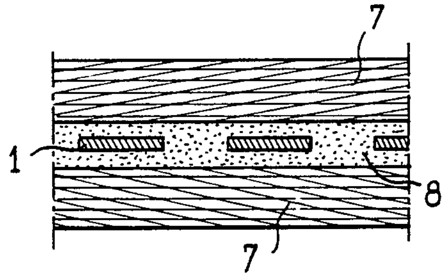
FIG. 8 is a sectional view showing the finished element according to said embodiment.
Figure 9:
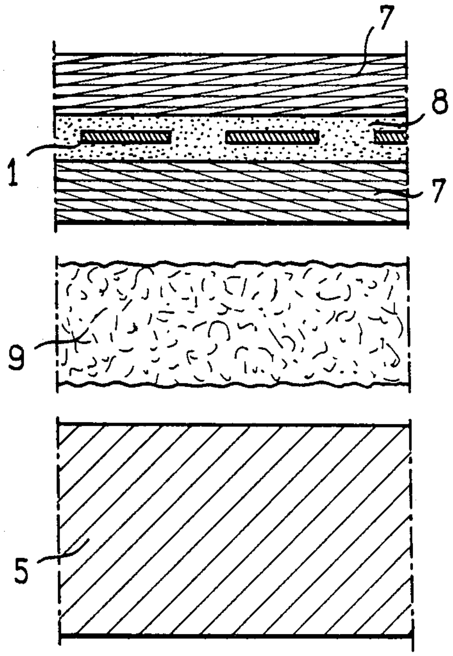
FIG. 9 is a sectional view showing the element according to that embodiment and a support, before assembly.

After polymerisation of the two layers 8 of phenolic resin, this resin completely coats the resistive sheet 1 and unites the two layers 7 of samicanite across the openings cut out in the resistive sheet 1, as shown in FIG. 8. In order to secure the heating element to the support 5, a layer 9 of ceramic felt impregnated with polyimide resin is interposed between them as shown in FIG. 9. The polymerisation of the polyimide resin contained in the layer 9, effected by heating, unites the heating element to the support 5.

Figure 10:
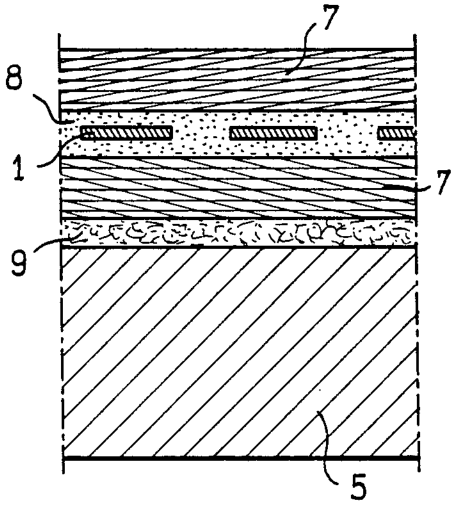
FIG. 10 is a sectional view showing the finished heating plate.

As in the case of the embodiment shown in FIG. 6, the heating plate shown in FIG. 10 withstands temperatures exceeding 400° C. while still giving a perfectly uniform temperature distribution which thus avoids all risk of localised hot spots.

Figure 11:
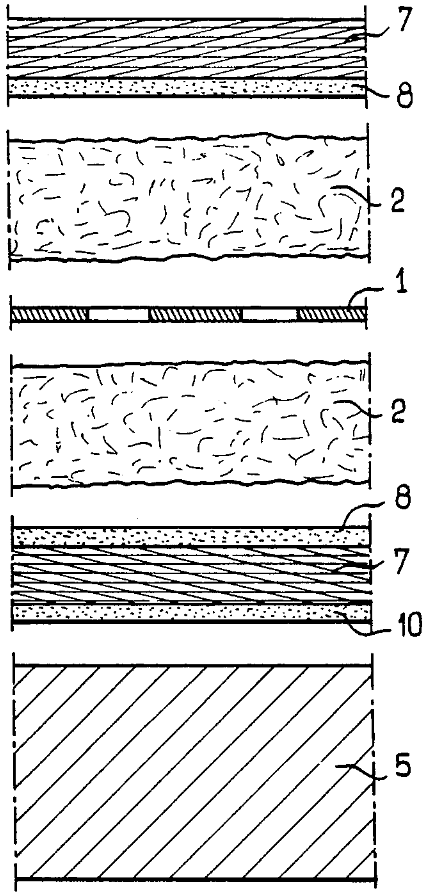
FIG. 11 is a sectional view showing the different layers of a second embodiment and a support, before assembly.

In the embodiment of FIG. 11, the cutout resistive sheet 1 is positioned, as in the embodiment according to FIG. 1, between two layers 2 of ceramic felt impregnated with polyimide resin. Two composite layers, each comprising a layer 7 of samicanite coated with a layer 8 of phenolic resin, the latter being adjacent the felt layer 2, are applied one on either side of the two layers 2. A further layer 10 of phenolic resin is applied between the support 5 and the adjacent layer 7 of samicanite.

In order to secure the various layers to the support 5, the assembly is heated to polymerise the layers 8, 10 of phenolic resin and the polyimide resin contained in the felt layers 2. Thus the various layers of the heating element (see FIG. 12) are solidified at the same time as the latter is securely fixed to the support 5, while an excellent thermal insulation between the cutout resistive sheet 1 and the support 5 is assured.

As in the preceding embodiments, the thickness of the heating element does not in general exceed 1 mm, so that the thickness of the insulating material held between the support 5 and the resistive sheet 1 has practically no effect on the heat transmission properties.

Figure 12:
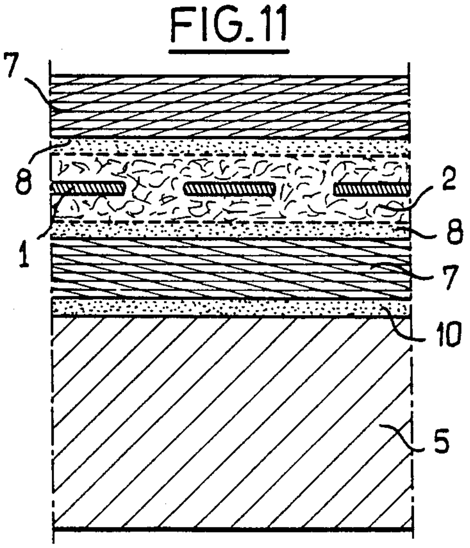
FIG. 12 is a sectional view showing the finished heating plate.

Moreover, in the case of the embodiment according to FIG. 12, as of that of FIG. 10, the layer 7 of samicanite which faces the support 5 mechanically protects the resistive sheet 1 and avoids all risk of adhesion of the assembly to the walls of the mould used for moulding and heat treating the assembly.

Figure 13:
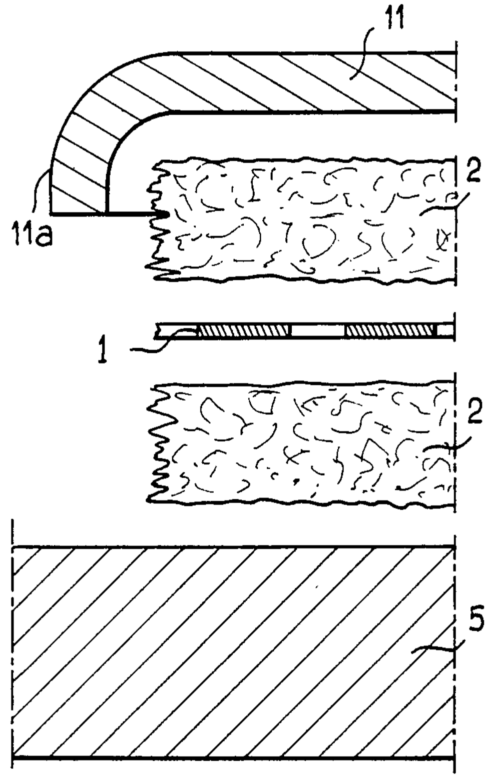
FIG. 13 is a sectional view showing the different layers of a third embodiment, of a cover plate for the heating element and of a support, before assembly.
Figure 14:
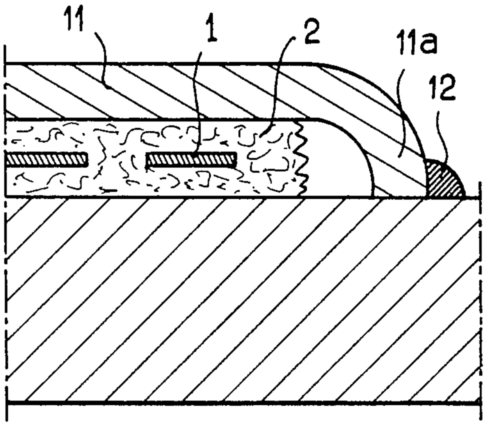
FIG. 14 is a sectional view showing the finished heating plate.
Figure 15:
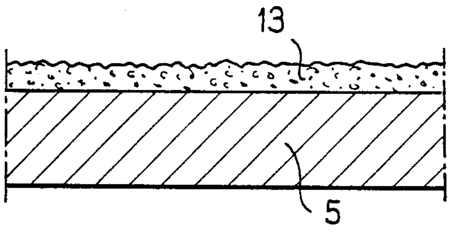
FIGS. 15 to 18 are sectional views showing the different stages in the manufacture of a fourth embodiment in which the heating element is integral with the support.
Figure 16:
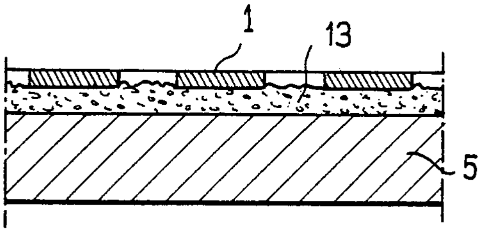
Figure 17:
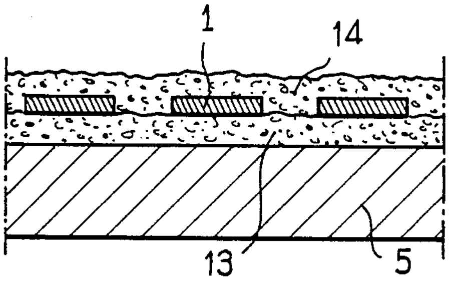
Figure 18:
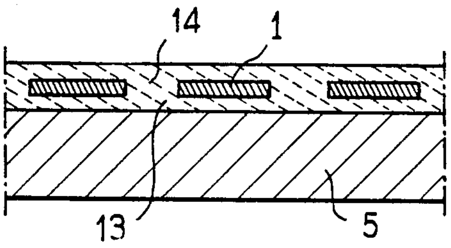

In the case of the embodiment according to FIG. 13, the heating element is composed, as in the embodiment of FIG. 1, of two layers 2 of ceramic felt impregnated with polyimide resin and applied on either side of the resistive sheet 1. This heating element, instead of being glued to the support 5, is blocked up against the latter by means of a counter-plate 11, for example of aluminium, the turned-down edge 11*a* of which is secured to the support 5 by means of a welded seal 12 (see FIG. 14).

Once the counter-plate 11 has been welded to the support, the assembly is heated to polymerise the polyimide resin contained in the layers 2, so as to unite the latter simultaneously to the resistive sheet 1, the support 5 and the counter-plate 11.

In this embodiment, the support 5 can be the aluminium base of a kitchen utensil. The counter-plate 11 sealingly secured to this base, enables the resistive sheet 1 to be preserved from all contact with moisture.

In the embodiment illustrated by FIGS. 15 to 18, the resistive sheet 1 is secured to and electrically insulated from the support 5 by enamel.

In a first stage (see FIG. 15) there is applied to the support 5, for example of aluminium, a layer 13 of conventional enamel barbotine [fixing paste] for aluminium, and this layer is then dried.

In a second stage (see FIG. 16) the cutout resistive sheet 1 is placed upon the layer 13 of enamel barbotine.

In a third stage (see FIG. 17) a second layer 14 of enamel barbotine is applied to the resistive sheet 1 and subsequently dried.

Going on to a final stage (see FIG. 18) the two layers of enamel 13 and 14 are simultaneously baked. During this baking, the two layers of enamel 13 and 14 are united across the openings of the resistive sheet 1 while completely coating the latter and becoming attached to the support 5.

As in the case of the preceding embodiments, the support 5 can be the base of a kitchen utensil. The layers of enamel 13, 14 effectively protect the resistive sheet 1 against shock, withstand heating to a temperature above 400° C. and guarantee excellent heat insulation.

Figure 19:
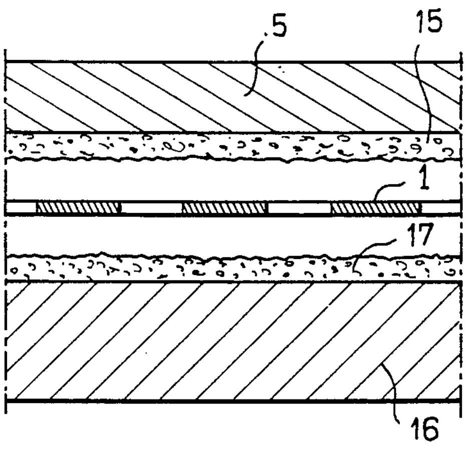
FIGS. 19 to 21 are sectional views showing the different stages in the manufacture of a fifth embodiment.
Figure 20:
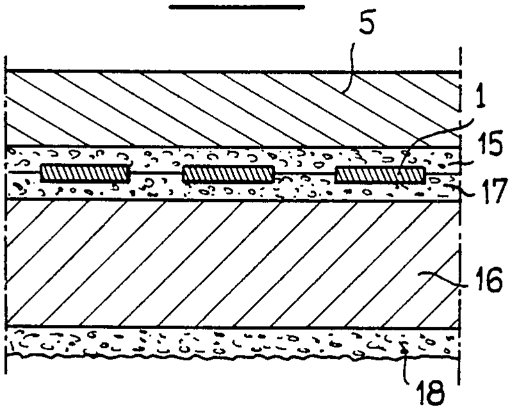
Figure 21:
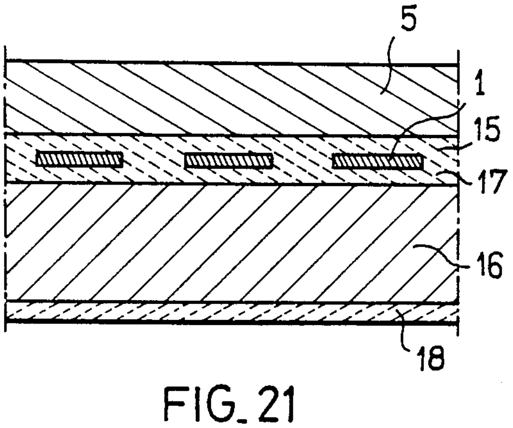

In the embodiment of FIGS. 19 to 21, the union between the resistive sheet 1 and the support 5 is likewise obtained by means of enamel.

In a first stage (see FIG. 19) the support 5 (e.g. the stainless steel plate of the base of a kitchen utensil) is covered in a layer 15 of enamel barbotine. Likewise the surface of a counter-plate 16 of aluminium is covered by a layer 17 of enamel barbotine. After drying of the two layers 15 and 17 of enamel barbotine, the support 5 is applied against the counter-plate 16 in a second stage (see FIG. 20) so that the resistive sheet 1 is covered on both its faces by the layers of barbotine 15 and 17. A third layer 18 of enamel barbotine is likewise applied on the face of the counter-plate 16 remote from the support 5.

Going on to a third stage (see FIG. 21) the three layers of enamel 15, 17, 18 are simultaneously baked. There is thus obtained a heating base comprising a resistance sheet 1 sandwiched between two metal plates 5, 16 one of which is covered by a layer of enamel 18. The two layers of enamel 15, 17 provide an excellent bond between the two plates 5 and 16, perfectly insulate the resistive sheet 1 and assure excellent sealing for the latter. In addition, these enamel layers allow the heating base to withstand temperatures exceeding 400° C.

Figure 22:
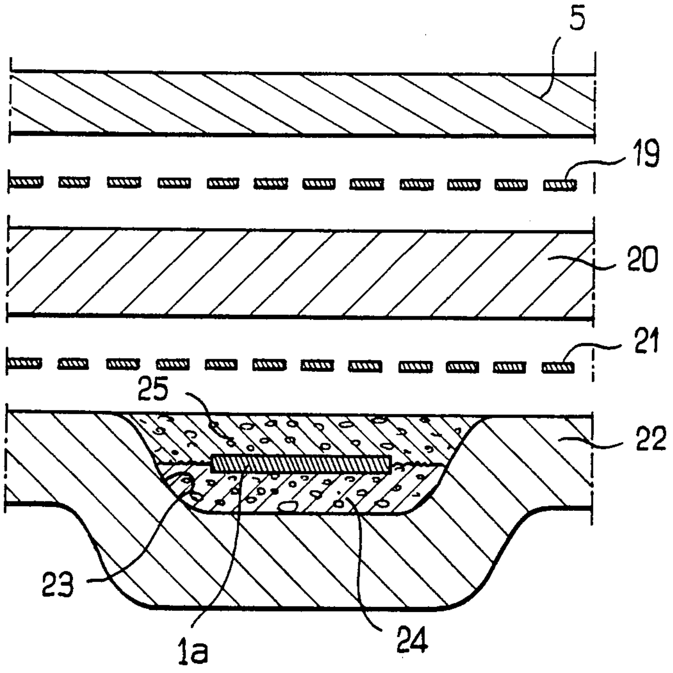
FIG. 22 is a sectional view showing the different layers of a sixth embodiment, before assembly.
Figure 23:
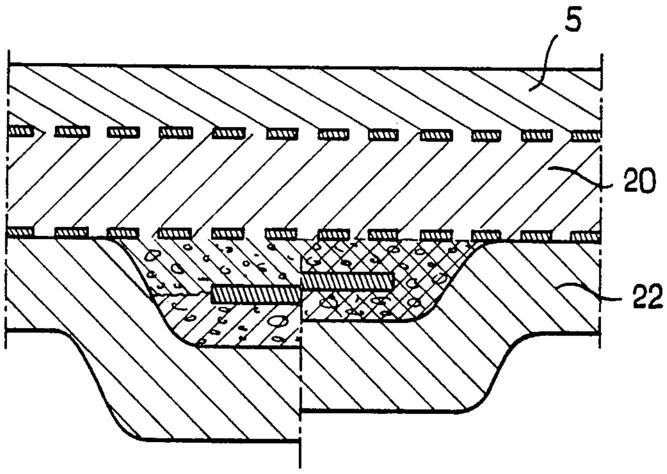
FIG. 23 is a sectional view of the finished heating plate.

In the embodiment of FIGS. 22, 23, the support 5 is the stainless steel sheet base of a kitchen utensil. A first aluminium plate 20 is secured against the support 5 by a layer of brazing or soldering 19. A second aluminium plate 22 is secured against the first plate by means of a second layer of brazing or soldering 21. This second plate 22 is dished so as to form between itself and the first plate 20 a void 23 adapted to receive the cutout resistance 1*a* represented in FIG. 3. This resistance 1*a* is positioned between two layers 24, 25 of insulating refractory cement.

Before the cement of the layers 24, 25 has hardened, the depressions made in the plate 22 are squeezed towards the first plate 20 (see the right hand side of FIG. 23) so as to ensure that the cement coheres.

In this version, the refractory cement can be replaced by a paste based on powdered refractory and insulating material such as alumina or magnesia. These powders can be heated to sinter them so as to obtain bonding between the powders.

Figure 24:
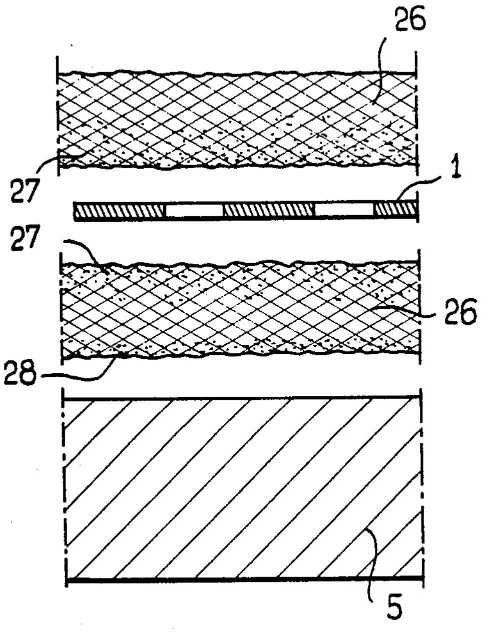
FIG. 24 is a sectional view showing the different layers of a seventh embodiment, before assembly.
Figure 25:
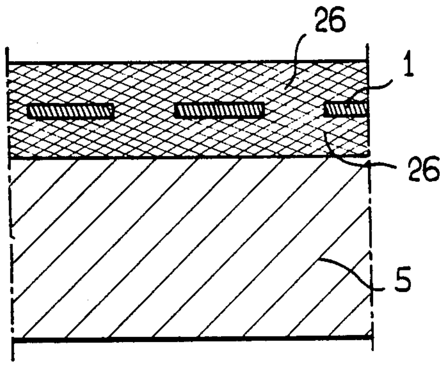
FIG. 25 is a sectional view of the finished heating plate.
Figure 26:
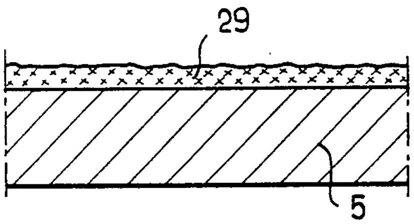
FIGS. 26 to 29 are sectional views showing the different stages in the manufacture of an eighth embodiment.
Figure 27:
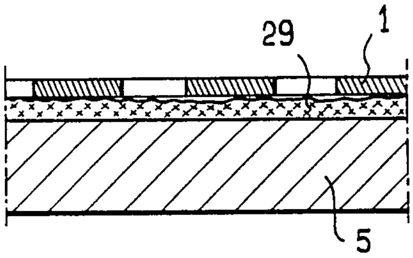
Figure 28:
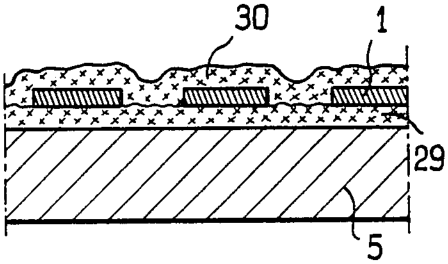
Figure 29:
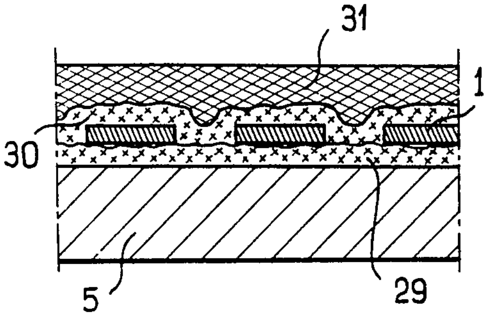

In the embodiment of FIGS. 24 and 25, the resistive sheet 1 is sandwiched between two layers 26 of a felt of ceramic fibre. These two felt layers 26 are impregnated by a silicone resin 27 on their faces adjacent to the resistive sheet. One of the felt layers 26 is impregnated with a second layer of silicone resin 28 on its face which adjoins the support 5. When the assembly is heated, the layers 27, 28 of silicone resin polymerise, simultaneously assuring a bond between the two layers of ceramic fibre 26 across the openings of the resistive sheet 1, and bonding of these two layers 26 of ceramic fibre to the support 5.

In the embodiment of FIGS. 26 to 29, the resistive sheet 1 is bonded to the support 5 by means of alumina projected in the form of plasma.

In a first stage (see FIG. 26) a first layer of alumina 29 is projected in the form of plasma.

In a second stage (see FIG. 27) the resistive sheet 1 is placed upon the alumina layer 29.

In a third stage (see FIG. 28) the resistive sheet 1 is covered by a second layer of alumina 30 which adheres to the first layer 29 across the openings of the resistive sheet 1.

In a final stage (see FIG. 29) the second layer of alumina 30 is coated with a layer of thermosetting resin 31 which protects it against mechanical shock.

Figure 30:
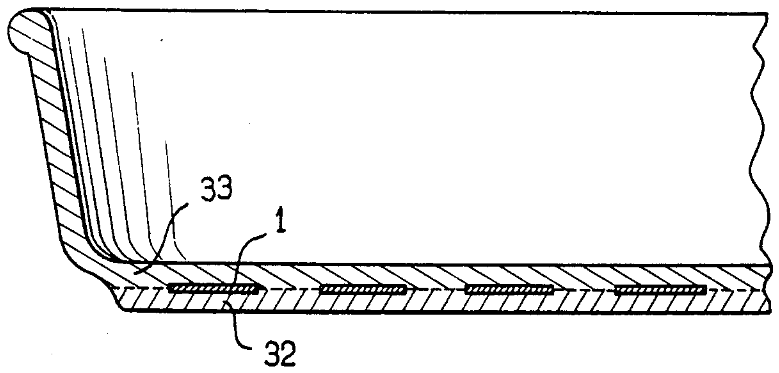
FIG. 30 is a sectional view showing a ninth embodiment.

In the embodiment of FIG. 30, there is shown a low temperature heating vessel manufactured by moulding in polyester resin impregnated with glass fibre.

In a first stage, a part 32 of the thickness of the base of the vessel is moulded, and the resistive sheet 1 is then placed upon it.

In a second stage, the remainder 33 of the vessel is moulded on top of the first part 32.

Figure 31:
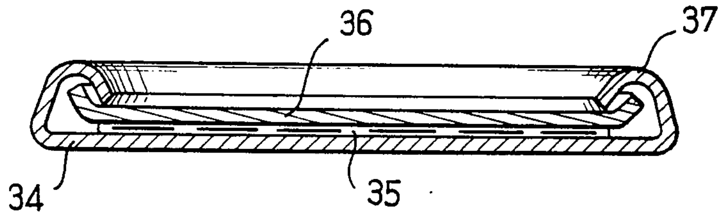
FIG. 31 is a sectional view showing a tenth embodiment.

In the embodiment of FIG. 31, there is shown a sole 34 of an iron, onto which is applied a heating element 35 in accordance with the invention, for example of the type thereof represented in FIGS. 4 or 8.

In this example, the sole 34 is made from a single sheet of chromium plated steel. A counter-plate 36 is applied on top of the heating element 35 and pressed thereto by a fitting formulation 37 made along the edge of the sole 34. There is thus obtained an excellent thermal contact between the heating element 35 and the sole 34. Since the heating element 35 extends over practically the entire inner surface of the sole 34, the assembly thereof is heated in a uniform manner.

Furthermore, given the relative thinness of the sheet which forms the sole 34, a very rapid temperature rise can be obtained. In fact, as a result of the transverse section of the heating element 35 compared to the diameter of the conventional wire, a thermal contact of much better quality is obtained, and a self-rigidity of the resistance assembly which has a correct mechanical disposition. Moreover, this kind of embodiment of the sole 34 is very simple and economical. It also presents the advantage, compared to conventional thick soles, of being very much lighter than the latter.

Indeed, the invention is not limited to the examples just described, and many modifications can be made to them without departing from the scope of the invention.

Thus, the invention can be applied to heating supports of material other than metal, such as ceramics, glass or the crystalline vitreous materials used for the tops of stoves.

The heating element can likewise be applied to plane [level] supports perforated in the form of a frame, so as to effect heating with a flow of air. In this case, the support can be of insulating material or composite reinforced material (e.g. an insulator over a steel element).

The heating element can also be applied upon supports which are complete and perforated in three-dimensional manner, for example for effecting the heating of a hollow utensil through the base and the side wall, or heating with a flow of air, as in the case of a hair dryer.

In the above description, heating elements have been described in embodiments intended for heating to temperatures between 400° and 500° C. Of course the invention is equally applicable to heating elements intended for heating to temperatures below the values mentioned and for example to temperatures between 100° C. and 200° C. In this case, the substrate in which the cutout resistance is coated can be provided by a layer of paint or varnish which withstands a temperature between 100° C. and 200° C. This substrate can likewise be produced in thermoplastic or thermosetting material, and can itself constitute the wall of the heating article.

We claim:

1. A method of producing a flat electrical resistance heating element, especially for a household article having a heating surface, comprising cutting out a heating resistance from a metal sheet, preparing two sheets of mica paper consisting of mica flakes impregnated with an unpolymerized silicone resin that is adapted to polymerize under the action of heat, forming a sandwich of said heating resistance between said two sheets of mica paper impregnated with an unpolymerized silicone resin, and heating said sandwich until said two sheets and said heating resistance are secured together by the polymerization of said silicone resin.

2. A method according to claim 1, wherein the metal sheet is chosen from stainless steel, iron-nickel alloy and nickel-chrome alloy.

3. A method according to claim 1, wherein one of the faces of said heating element is covered by a layer of a material which is resistant to the heating temperature.

4. A method according to claim 3, wherein said layer is a metal sheet or plate.

5. A method according to claim 1, and securing the heating element to a support.

6. A method according to claim 5, wherein the support is chosen from aluminum, stainless steel, mild steel, ceramics, crystalline vitreous material and glass.

7. A method according to claim 5, wherein the heating element is integrated with the support by polymerization of the silicone resin contained in the two sheets of mica paper impregnated with an unpolymerized silicone resin.

8. A method according to claim 1, wherein said mica paper is a laminate of paper sheets impregnated with phenolic resin charged with mica flakes.

* * * * *